(12) United States Patent
Chen et al.

(10) Patent No.: US 7,913,008 B2
(45) Date of Patent: Mar. 22, 2011

(54) AUTO-DETECTION SYSTEM AND METHOD FOR COMMUNICATION PROTOCOL

(75) Inventors: Shen-An Chen, Taipei Hsien (TW); Rong-Hwang Horng, Taipei Hsien (TW); You-Ren Lin, Taipei Hsien (TW); Rong-Cong Hung, Taipei Hsien (TW); Yaw-Shen Lai, Taipei Hsien (TW); Shih-Chang Chen, Taipei Hsien (TW)

(73) Assignee: Foxnum Technology Co., Ltd., Tucheng, Taipei County (TW)

( * ) Notice: Subject to any disclaimer, the term of this patent is extended or adjusted under 35 U.S.C. 154(b) by 73 days.

(21) Appl. No.: 12/340,647

(22) Filed: Dec. 20, 2008

(65) Prior Publication Data

US 2010/0033351 A1    Feb. 11, 2010

(30) Foreign Application Priority Data

Aug. 8, 2008   (CN) .......................... 2008 1 0303620

(51) Int. Cl.
G06F 13/42   (2006.01)
G06F 3/00    (2006.01)
G06F 5/00    (2006.01)
(52) U.S. Cl. ......................................... 710/105; 710/60
(58) Field of Classification Search .............. 710/60, 710/105; 341/20
See application file for complete search history.

(56) References Cited

U.S. PATENT DOCUMENTS

| | | | | |
|---|---|---|---|---|
| 4,771,417 A | * | 9/1988 | Maxwell et al. | 370/296 |
| 5,200,949 A | * | 4/1993 | Kobayashi | 370/228 |
| 5,222,081 A | * | 6/1993 | Lewis et al. | 375/369 |
| 5,226,121 A | * | 7/1993 | Spenik et al. | 709/236 |
| 5,408,421 A | * | 4/1995 | Prest et al. | 702/187 |
| 5,490,209 A | * | 2/1996 | Kennedy et al. | 379/93.08 |
| 5,631,952 A | * | 5/1997 | O'Barr et al. | 379/93.01 |
| 5,654,983 A | * | 8/1997 | Sauser, Jr. | 375/225 |
| 5,684,864 A | * | 11/1997 | Shibata | 379/100.01 |
| 5,687,174 A | * | 11/1997 | Edem et al. | 370/446 |
| 5,938,731 A | * | 8/1999 | Schreiter | 709/227 |
| 6,072,827 A | * | 6/2000 | Krulce | 375/225 |
| 6,097,754 A | * | 8/2000 | Fitch et al. | 375/222 |

(Continued)

FOREIGN PATENT DOCUMENTS

EP    918421 A1 *   5/1999

(Continued)

OTHER PUBLICATIONS

Eggers et al., "Ethernet Autonegotiation Best Practices", Jul. 8, 2004, Sun Microsystems, Sun BluePrints OnLine, Revision A, pp. 1-18.*

(Continued)

*Primary Examiner* — Faisal M Zaman
(74) *Attorney, Agent, or Firm* — Zhigang Ma

(57) ABSTRACT

An auto-detection system for communication protocol includes a driving device, a communication mode selection circuit and a human-machine interface circuit. The human-machine interface circuit transmits a detection signal to the driving device through the communication mode selection circuit. The detection signal includes a transmission speed identification and a transmission mode identification. The driving device sets its transmission speed according to the value of the transmission speed identification of the detection signal and sets its transmission mode according to the transmission mode identification of the detection signal. An auto-detection method for communication protocol using the auto-detection system for communication protocol is also provided.

6 Claims, 3 Drawing Sheets

U.S. PATENT DOCUMENTS

| | | | | |
|---|---|---|---|---|
| 6,157,689 A * | 12/2000 | Petty et al. | | 375/370 |
| 6,169,746 B1 * | 1/2001 | Ueda et al. | | 370/466 |
| 6,198,785 B1 * | 3/2001 | Flynn | | 375/377 |
| 6,349,331 B1 * | 2/2002 | Andra et al. | | 709/220 |
| 6,366,632 B1 * | 4/2002 | Noh | | 375/371 |
| 6,614,796 B1 * | 9/2003 | Black et al. | | 370/403 |
| 6,792,337 B2 * | 9/2004 | Blackett et al. | | 700/295 |
| 6,798,869 B1 * | 9/2004 | Sidhu et al. | | 379/93.33 |
| 6,813,525 B2 * | 11/2004 | Reid et al. | | 700/19 |
| 6,880,015 B1 * | 4/2005 | Siders | | 709/230 |
| 7,333,536 B2 * | 2/2008 | Sinha et al. | | 375/225 |
| 7,676,592 B2 * | 3/2010 | Coffey | | 709/233 |
| 7,752,280 B2 * | 7/2010 | Wei | | 709/208 |
| 2004/0246919 A1 * | 12/2004 | Larsson | | 370/328 |
| 2005/0287963 A1 * | 12/2005 | Ikeda | | 455/115.1 |
| 2007/0147251 A1 * | 6/2007 | Monsen | | 370/235 |
| 2008/0240142 A1 * | 10/2008 | Belgaied et al. | | 370/420 |
| 2008/0316048 A1 * | 12/2008 | Abdallah | | 340/854.6 |

FOREIGN PATENT DOCUMENTS

| | | | |
|---|---|---|---|
| JP | 2003298614 A | * | 10/2003 |
| WO | WO 9851120 A2 | * | 11/1998 |
| WO | WO 9960760 A1 | * | 11/1999 |
| WO | WO 0010292 A2 | * | 2/2000 |
| WO | WO 0284469 A2 | * | 10/2002 |

OTHER PUBLICATIONS

Frazier et al., "Gigabit Ethernet: from 100 to 1,000 Mbps," Internet Computing, IEEE, vol. 3, No. 1, pp. 24-31, Jan./Feb. 1999.*

Baker, M.;, "Adaptive data communication techniques for HF systems," Military Communications Conference, 1993. MILCOM '93. Conference record. 'Communications on the Move'., IEEE, vol. 1, No., pp. 57-61 vol. 1, Oct. 11-14, 1993.*

"Augonegotiation", Wikipedia.org, Wikimedia Foundation, Inc., retrieved from the Internet at http://en.wikipedia.org/wiki/Autonegotiation on Sep. 16, 2010, pp. 1-6.*

* cited by examiner

AUTO-DETECTION SYSTEM AND METHOD FOR COMMUNICATION PROTOCOL

BACKGROUND

1. Field of the Invention

Embodiments of the present disclosure relate to communication protocols and, particularly, to an auto-detection system and method for a communication protocol between a human-machine interface circuit and a driving device.

2. Description of Related Art

Driving devices require adjustment in different applications to achieve optimum motor performance. The communication protocol between a human-machine interface circuit and the driving device, along with transmission speeds therebetween, often determines the quality of communication. At present, a commonly used communication protocol is MODBUS. The MODBUS protocol includes an American Standard Code for Information Interchange (ASCII) transmission mode and a Remote Terminal Unit (RTU) transmission mode. The ASCII transmission mode includes six subprotocols, and the RTU transmission mode includes three subprotocols. The number of combinations between the subprotocols and the transmission modes is nine. The number of transmission speeds of the driving device is six. Therefore, the number of combinations between the transmission modes and the transmission speeds is fifty-four. When a specification of the driving device is lost or controls of a control panel are damaged, the setting value between the transmission modes and the transmission speeds cannot be acquired, necessitating a time-consuming manual search among the fifty-four combination forms.

Accordingly, an auto-detection system and a method for communication protocol are desired in order to overcome the described limitations.

DETAILED DESCRIPTION OF CERTAIN INVENTIVE EMBODIMENTS

Figure 1:
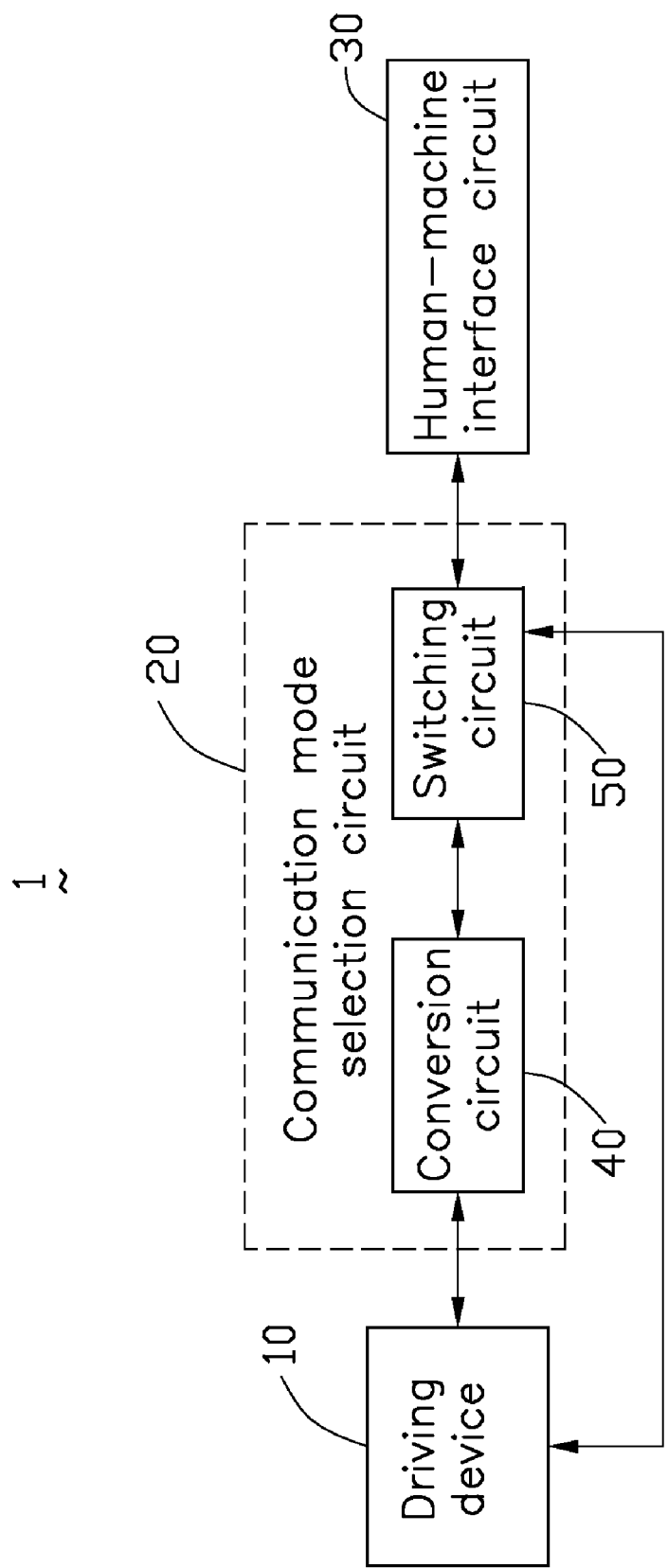
FIG. 1 is a functional block diagram of an exemplary auto-detection system for a communication protocol.

FIG. 1 is a functional block diagram of an embodiment of an auto-detection system 1 for communication protocol. The system 1 typically includes a driving device 10, a communication mode selection circuit 20, and a human-machine interface circuit 30. The communication mode selection circuit 20 includes a conversion circuit 40 and a switching circuit 50. The driving device 10 connects to the conversion circuit 40 and the switching circuit 50. The conversion circuit 40 connects to the switching circuit 50. The switching circuit 50 also connects to the human-machine interface circuit 30.

The human-machine interface circuit 30 transmits a detection signal to the switching circuit 50. The detection signal includes transmission speed identification (hereinafter referred to as TSI), transmission mode identification (hereinafter referred to as TMI), and communication mode identification (hereinafter referred to as CMI). In the exemplary embodiment, the effective value of the TSI is A, and effective values of the TMI and the CMI equal zero. The invalid values of the TMI and the CMI equal one.

The switching circuit 50 sets the communication mode between the driving device 10 and the human-machine interface circuit 30 according to the value of the CMI. If the value of the CMI equals zero, the communication mode between the driving device 10 and the human-machine interface circuit 30 is determined as full-duplex communication. The human-machine interface circuit 30 transmits the detection signal to the driving device 10 through the switching circuit 50 and the conversion circuit 40. If the value of the CMI equals one, the communication mode between the driving device 10 and the human-machine interface circuit 30 is determined as half-duplex communication. The human-machine interface circuit 30 transmits the detection signal to the driving device 10 through the switching circuit 50.

The driving device 10 determines whether the detection signal is effective. If the value of TSI of the detection signal is A, the detection signal is effective. The driving device 10 initializes auto-detection of the transmission speed of the human-machine interface circuit 30 and sets the transmission speed as its transmission speed. Otherwise, the detection signal is invalid. The driving device 10 transmits a feedback signal to the human-machine interface circuit 30. The human-machine interface circuit 30 receives the feedback signal and then continuously transmits the detection signals to the driving device 10 until the received detection signal is determined as effective. The driving device 10 determines whether the TMI of the detection signal equals zero. If so, the driving device 10 sets its transmission mode as ASCII mode. If the value of the TMI of the detection signal equals one, the driving device 10 sets its transmission mode as RTU mode.

After the transmission mode and the transmission speed of the driving device 10 have been set, the human-machine interface circuit 30 detects the communication protocol of the driving device 10 according to the transmission mode. If the transmission mode of the driving device 10 is ASCII mode, the human-machine interface circuit 30 sets its communication protocol to be the first communication protocol chosen from any of the six communication protocols of ASCII mode. After the communication protocol has been set, the human-machine interface circuit 30 transmits a control signal to the driving device 10. The control signal includes a default signal. The driving device 10 receives the control signal and transmits the feedback signal to the human-machine interface circuit 30. If the feedback signal and the default signal are identical, the protocol set by the human-machine interface circuit 30 and the communication protocol of the driving device 10 are determined as identical. Automatic detection of the communication protocol of the driving device 10 is complete. Otherwise, the protocol set by the human-machine interface circuit 30 and the communication protocol of the driving device 10 are not identical. The human-machine interface circuit 30 can continues to set its communication protocol as the second communication protocol by choosing one from the rest of the six communication protocols of ASCII mode and transmits the control signal to the driving device 10, and keeps on repeating the process until the feedback signal and the default signal are identical.

The auto-detection system 1 for communication protocol sets the transmission mode and the transmission speed of the driving device 10. Human-machine interface circuit 30 is able to try to set its communication protocol determining the communication protocol of the driving device 10 fewer than six times. Similarly, if the transmission mode of the driving device 10 is RTU mode, the human-machine interface circuit 30 sets its communication protocol determining the communication protocol of the driving device 10 fewer than three times.

Figure 2A:
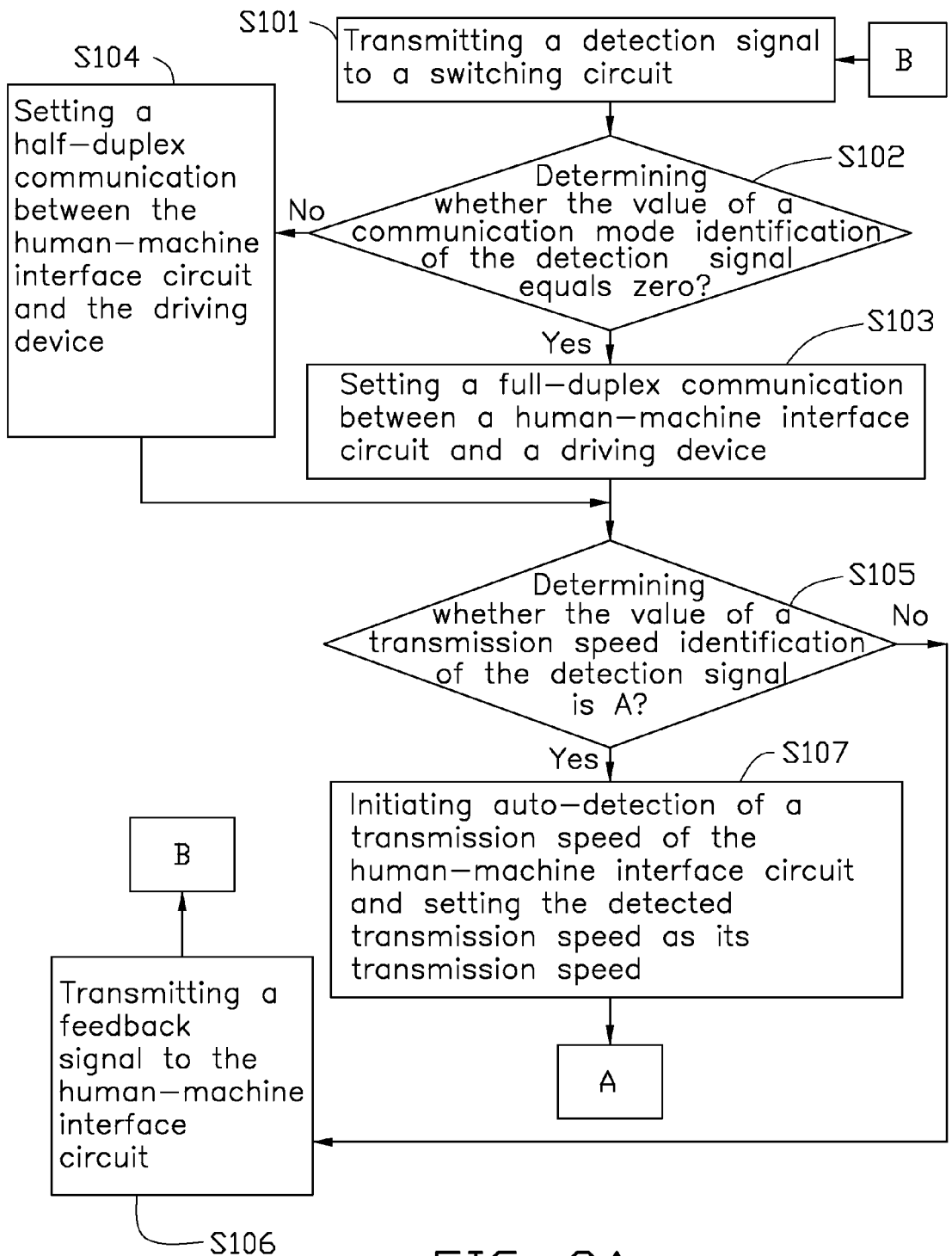
FIGS. 2A and 2B are flowcharts of an exemplary auto-detection method for communication protocol.
Figure 2B:
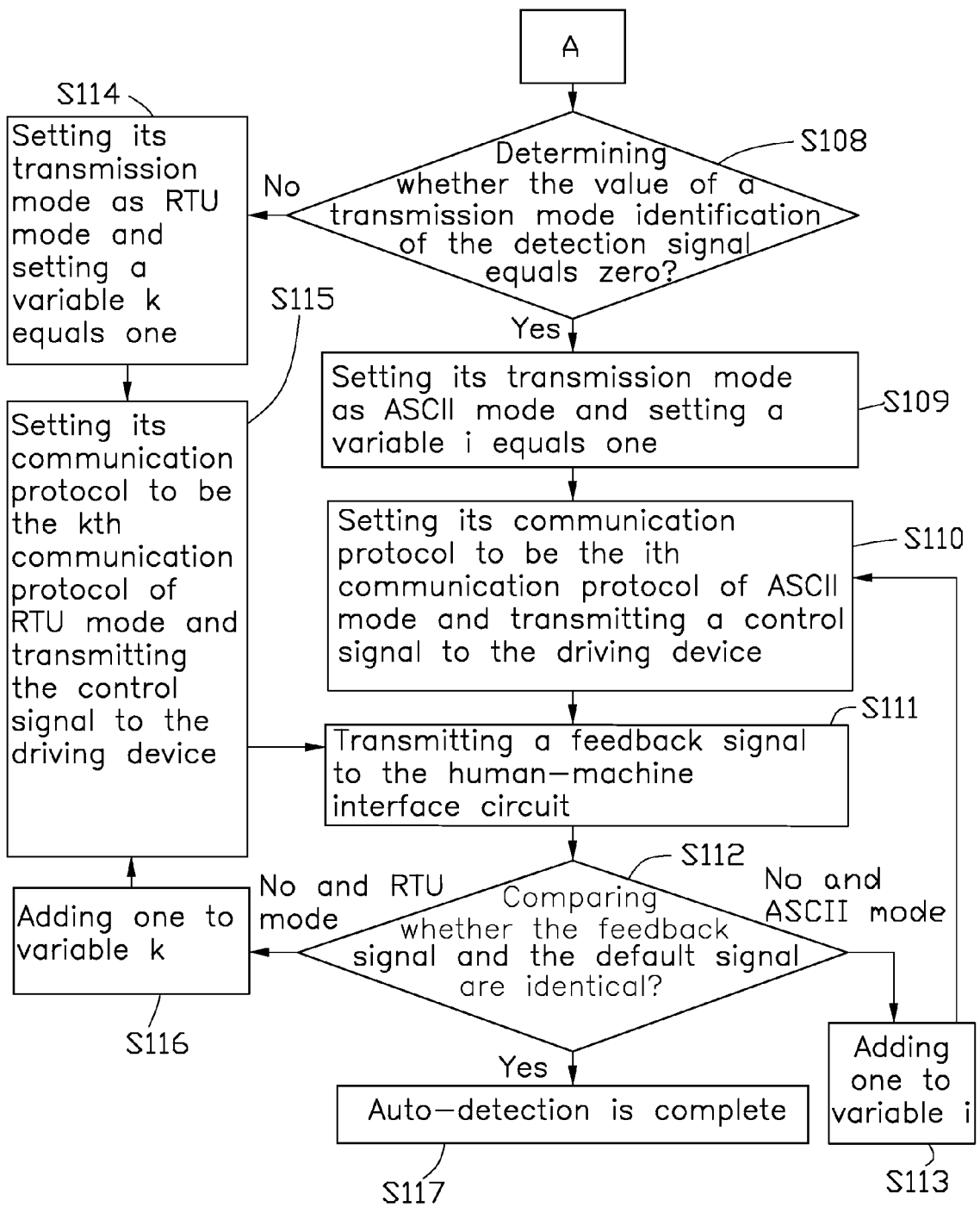

FIGS. 2A 2B are flowcharts of an embodiment of an auto-detection method for communication protocol.

In step S101, the human-machine interface circuit 30 transmits the detection signal to the switching circuit 50.

In step S102, the switching circuit 50 determines whether the value of the CMI of the detection signal equals zero. If so, S103 is implemented. If the value of the CMI of the detection signal equals one, step S104 is implemented.

In step S103, the communication mode between the human-machine interface circuit 30 and driving device 10 is determined to be full-duplex communication, and step S105 is implemented.

In step S104, the communication mode between the human-machine interface circuit 30 and driving device 10 is determined to be half-duplex communication, and step S105 is implemented.

In step S105, the driving device 10 receives the detection signal and determines whether the value of the TSI of the detection signal is A. If so, step S107 is implemented. If not, step S106 is implemented.

In step S106, the driving device 10 transmits the feedback signal to the human-machine interface circuit 30, and step S101 is repeated.

In step S107, the driving device 10 initializes auto-detection the transmission speed of the human-machine interface circuit 30 and sets the detected transmission speed as its transmission speed.

In step S108, the driving device 10 determines whether the value of the TMI of the detection signal equals zero. If so, step S109 is implemented. If not, step S114 is implemented.

In step S109, the driving device 10 sets its transmission mode as ASCII mode and sets a variable i to one.

In step S110, the human-machine interface circuit 30 sets its communication protocol to be the ith communication protocol of ASCII mode and transmits the control signal to the driving device 10. The control signal includes a default signal.

In step S111, the driving device 10 receives the control signal and transmits the feedback signal to the human-machine interface circuit 30.

In step S112, the human-machine interface circuit 30 determines whether the feedback signal and the default signal are identical. If so, step S117 is implemented, the communication protocol of the driving device 10 and the human-machine interface circuit 30 are identical, and detection of the communication protocol of the driving device 10 is complete. If not, when the transmission mode of the driving device 10 is ASCII mode, step S113 is implemented, and when the transmission mode of the driving device 10 is RTU mode, step S115 is implemented.

In step S113, one is added to the variable i, and step S110 is implemented.

In step S114, the driving device 10 sets its transmission mode as RTU mode and sets a variable k to one, and step S116 is implemented.

In step S115, one is added to the variable k, and step S116 is implemented.

In step S116, the human-machine interface circuit 30 sets its communication protocol to the kth communication protocol of RTU mode and transmits the control signal to the driving device 10, and step S111 is implemented. The control signal includes a default signal.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for auto-detection system for communication protocols, the method comprising:

transmitting a detection signal to a switching circuit;

determining whether the value of a communication mode identification of the detection signal equals zero; and if the value of a communication mode identification of the detection signal equals zero, setting a full-duplex communication between a human-machine interface circuit and a driving device;

if the value of a communication mode identification of the detection signal does not equal zero, setting a half-duplex communication between the human-machine interface circuit and the driving device;

determining whether the value of a transmission speed identification of the detection signal is an effective value; and if the value of a transmission speed identification of the detection signal is the effective value, initiating auto-detection of a transmission speed of the human-machine interface circuit and setting the detected transmission speed as its transmission speed;

determining whether the value of a transmission mode identification of the detection signal equals zero;

if the value of a transmission mode identification of the detection signal equals zero, setting its transmission mode as ASCII mode and setting a variable i equals one;

setting its communication protocol to be the ith communication protocol of ASCII mode and transmitting a control signal to the driving device;

transmitting a feedback signal to the human-machine interface circuit;

comparing whether the feedback signal and a default signal are identical; and if the feedback signal and the default signal are not identical, and the transmission mode is ASCII mode, adding one to variable i, and then return to step "setting its communication protocol to be the ith communication protocol of ASCII mode and transmitting a control signal to the driving device;"

if the feedback signal and the default signal are identical, detection of the communication protocol of the driving device is complete.

2. The method of claim 1, further comprising, after the step of determining whether the value of a transmission speed identification of the detection signal is an effective value:

if the value of a transmission speed identification of the detection signal is not the effective value, transmitting a feedback signal to the human-machine interface circuit and repeating the steps of the method prior to determination of whether the value of a transmission speed identification of the detection signal is the effective value.

3. The method of claim 1, further comprising, after the step of determining whether the value of a transmission mode identification of the detection signal equals zero:

if the value of a transmission mode identification of the detection signal does not equal zero, setting its transmission mode as RTU mode and setting a variable k equals one.

4. The method of claim 3, further comprising:

setting its communication protocol to be the kth communication protocol of RTU mode and transmitting the control signal to the driving device, the process then going to the step of the transmitting a feedback signal to the human-machine interface circuit step again.

5. The method of claim 1, further comprising, after determining whether the feedback signal and the default signal are identical:

if the feedback signal and the default signal are not identical, and the transmission mode is RTU mode, adding one to variable k.

6. The method of claim 5, further comprising:

setting the communication protocol to the kth communication protocol of RTU mode and transmitting the control signal to the driving device, then implementing transmission of a feedback signal to the human-machine interface circuit step.

\* \* \* \* \*